Feb. 23, 1965 R. KATULICH 3,170,985
MIRROR FOR VEHICLES
Filed Sept. 12, 1962

INVENTOR.
Rudolph Katulich
BY
Charles L. Lovercheck
Attorney

# United States Patent Office 3,170,985
Patented Feb. 23, 1965

3,170,985
MIRROR FOR VEHICLES
Rudolph Katulich, 212 W. Pleasant, Corry, Pa.
Filed Sept. 12, 1962, Ser. No. 223,004
1 Claim. (Cl. 88—87)

This invention relates to mirrors and, more particularly, to vehicle rear view mirrors.

Rear view mirrors combining a convex and a flat mirror have never been made in such manner that an automobile or truck driver can easily move his eyes from one mirror to the other without chance of interference one with the other. This movement is preferably from top to bottom and vice versa. The convex mirror, being at the top, can be viewed independently from the flat mirror.

It is, accordingly, an object of the present invention to provide an improved composite mirror.

Another object of the invention is to provide an improved mirror wherein an elongated plain mirror is supported in a common frame with a convex mirror.

A further object of the invention is to provide a mirror which is simple in construction, economical to manufacture, and simple and easy to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
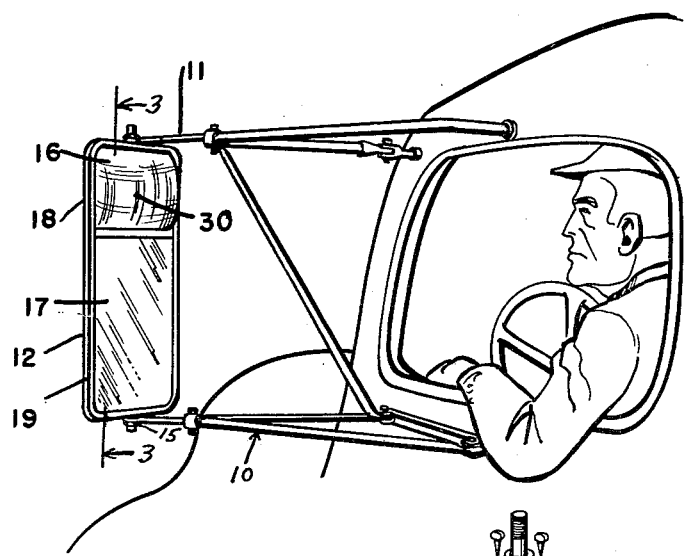
FIG. 1 is a view of a rear view mirror assembly illustrative of the invention.
Figure 2:
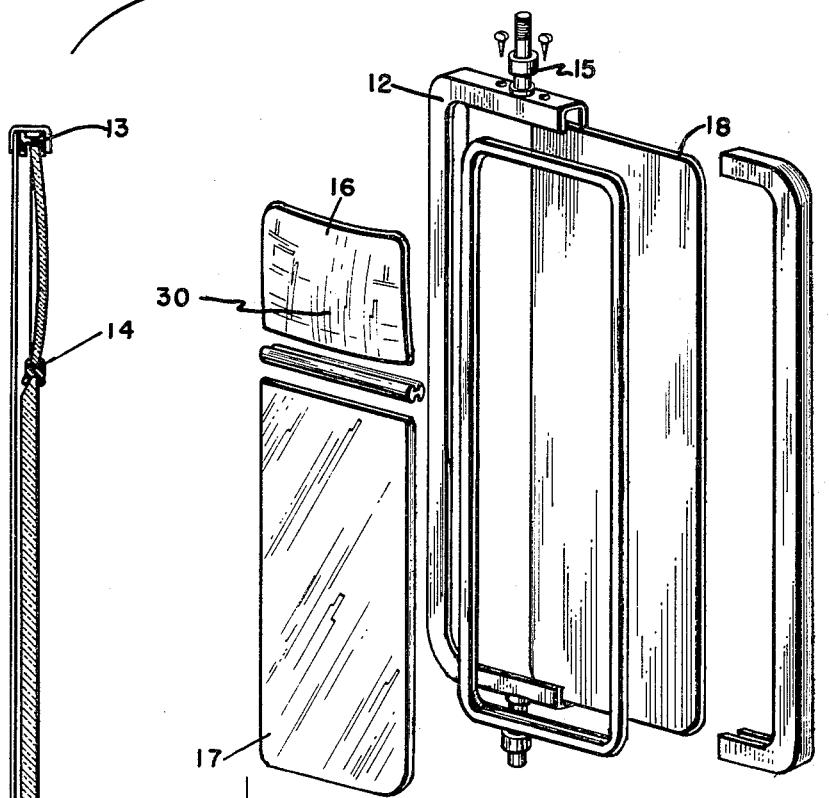
FIG. 2 is an exploded view of the mirror shown in FIG. 1 showing the mirror assembly pivoted in the bracket assembly.
Figure 3:
FIG. 3 is a cross sectional view of the mirror taken on line 3—3 of FIG. 1.

Now with more particular reference to the drawing, a mirror assembly 10 is shown comprising a mounting bracket 11 and swivels 15 for mounting the mirror assembly 10 thereto. The mounting bracket 11 may be fastened to the front of either side of a vehicle's cab or doors and the mirror assembly 10 is pivoted on the swivels 15 to give the operator of the vehicle the desired vision.

A top portion 18 of the mirror assembly 10 has a square convex mirror 16, giving the desired wide angle rear view to the rear and sides of the vehicle. A lower portion 19 of the mirror assembly 10 has a rectangular flat mirror 17. The rectangular mirror 17 is equal in width to the square mirror 16. The center of curvature 30 of the convex mirror 16 is approximately two-thirds down its height so that a broader view to the side and to the rear and above the road is possible.

The convex mirror 16 and the flat mirror 17 are both separated in a channel frame 12 with a rubber gasket 14 H-shaped in cross section between the mirrors 16 and 17 in the frame 12. The outer edges of the mirrors 16 and 17 are completely encased in a resilient channel gasket 13 U-shaped in cross section made of rubber or some similar material for mounting in the frame 12. The frame 12 is in the form of a flat sheet back 18. The back 18 rests against one leg of the U-shaped gasket 13. Back 18 and gasket 13 are received in the channel frame 12.

The channel frame 12 can be made of any material suitable for containing and supporting the combinations of mirrors disclosed herein; for example, it could be made of steel.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A rear view mirror comprising
  a rectangular flat mirror member and a square convex mirror member,
  the edges of said convex mirror member being generally in the same plane as the edges of said flat mirror member,
  said mirror members being secured in a frame with the long sides of said flat mirror member parallel to two of the sides of said square mirror member,
  a first continuous resilient channel member U-shaped in cross section encircling said mirror members and receiving the outer peripheral edges of three sides of each said mirror member,
  a second resilient member being H-shaped in cross section disposed between said mirror members and receiving the edges of said mirror members which are adjacent to each other,
  a flat sheet disposed generally parallel to the backs of said mirror members and having its outer edge disposed between the legs of and resting on the inside surface of one of the legs of said U-shaped resilient channel member,
  a rigid channel frame U-shaped in cross section defining a rectangular enclosure receiving said U-shaped resilient channel member and holding the outer edge of said flat sheet between the inside of a leg of said U-shaped rigid frame and the outside of a leg of said first resilient U-shaped member,
  a mounting bracket,
  said mounting bracket being adapted to be attached to the front of either side of a vehicle cab,
  said frame being pivotally attached to said mounting bracket at approximately the center of the short side of said frame,
  the long sides of said frame extending generally in a vertical direction,
  said convex mirror member being disposed above said flat mirror member,
  the center of curvature of said convex mirror member being substantially below the center of said flat mirror member whereby a greater portion of the area behind and above said vehicle is visible than the portion of the area behind and below said vehicle.

References Cited in the file of this patent

UNITED STATES PATENTS

| | | |
|---|---|---|
| 1,114,559 | Weed | Oct. 20, 1914 |
| 1,869,456 | Bausch | Aug. 2, 1932 |
| 2,588,825 | Goodman et al. | Mar. 11, 1952 |
| 2,860,546 | Bolser | Nov. 18, 1958 |
| 2,911,177 | West | Nov. 3, 1959 |
| 3,003,396 | Jenkins | Oct. 10, 1961 |
| 3,044,359 | Zanetti-Streccia | July 17, 1962 |

FOREIGN PATENTS

| | | |
|---|---|---|
| 827,336 | Great Britain | Feb. 3, 1960 |